(12) United States Patent
Kepplinger et al.

(10) Patent No.: US 6,183,534 B1
(45) Date of Patent: *Feb. 6, 2001

(54) PLANT AND PROCESS FOR THE PRODUCTION OF PIG IRON AND/OR SPONGE IRON

(75) Inventors: Leopold Werner Kepplinger, Leonding; Konstantin Milionis, Stiefling; Dieter Siuka, Neuhofen; Horst Wiesinger, Linz, all of (AT)

(73) Assignee: Voest-Alphine Industrieanlagenbau GmbH, Linz (AU)

(*) Notice: Under 35 U.S.C. 154(b), the term of this patent shall be extended for 0 days.

This patent is subject to a terminal disclaimer.

(21) Appl. No.: 09/148,780

(22) Filed: Sep. 4, 1998

Related U.S. Application Data

(63) Continuation-in-part of application No. 08/817,263, filed as application No. PCT/AT95/00199 on Oct. 12, 1995, now Pat. No. 5,989,308.

(30) Foreign Application Priority Data

Oct. 17, 1994 (AT) .................................................... 1958/94

(51) Int. Cl.$^7$ .................................................. C21B 13/14
(52) U.S. Cl. .............................. 75/436; 75/446; 266/160; 266/172

(58) Field of Search ..................... 75/436, 446; 266/160, 266/172

(56) References Cited

U.S. PATENT DOCUMENTS 5,989,308  *  11/1999  Kepplinger et al. ................... 75/436

* cited by examiner

*Primary Examiner*—Melvyn Andrews
(74) *Attorney, Agent, or Firm*—Ostrolenk, Faber, Gerb & Soffen, LLP

(57) ABSTRACT

In a plant for the production of pig iron and/or sponge iron, comprising at least one fluidized bed reactor adapted to receive fine ore, a reducing-gas feed duct leading to said fluidized bed reactor, an off gas discharge duct departing from the fluidized bed reactor and a discharge means, preferably a briquetting means, provided for the reduction product formed in the fluidized bed reactor, the off gas discharge duct of the fluidized bed reactor runs into a purification means, such as a scrubber, subsequently into a heating means and finally into the reducing gas feed duct of the fluidized bed reactor. To produce a product having a high quality standard at a minimum energy input, the heating means is constructed such that it comprises two stages including a heat exchanger as the heating means for the reducing gas and, connected serially therewith, a partial combustion means for the reducing gas with an oxygen feeding means.

6 Claims, 1 Drawing Sheet

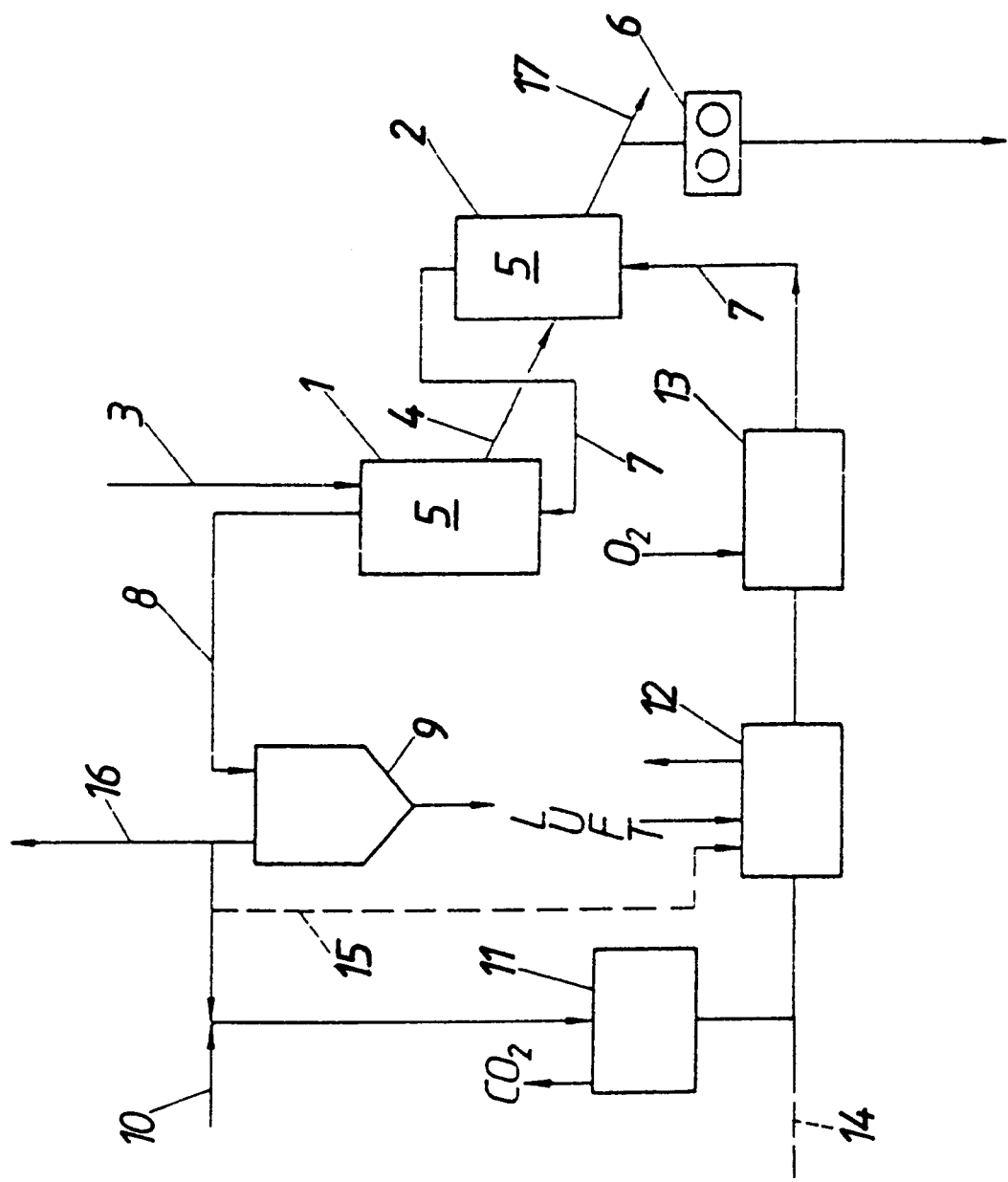

PLANT AND PROCESS FOR THE PRODUCTION OF PIG IRON AND/OR SPONGE IRON

This is a continuation-in-part of application Ser. No. 08/817,263, filed Apr. 17, 1997, which is a 371 of PCT/AT95/00199 filed Oct. 12, 1995 now U.S. Pat. No. 5,989,308.

The invention relates to a plant for the production of pig iron and/or sponge iron, comprising at least one fluidized bed reactor intended to receive fine ore, a reducing-gas feed duct leading to said fluidized bed reactor, an offgas discharge duct departing from the fluidized bed reactor and a discharge means, preferably a briquetting means, provided for the reduction product formed in the fluidized bed reactor, wherein the offgas discharge duct of the fluidized bed reactor runs into a purification means, such as a scrubber, subsequently into a heating means and finally into the reducing-gas feed duct of the fluidized bed. The invention further relates to a process for producing pig iron and/or sponge iron using this plant.

The processing of fine ore to sponge iron in a fluidized bed reactor, in principle, is known from U.S. Pat. No. 5,082,251. There, the reducing gas is produced by catalytic reformation of desulphurized and preheated natural gas with overheated water vapor in a reformer furnace. That process allows for the production of high-quality sponge iron from fine ore.

The invention is based on the object to improve a plant of the type initially described in such a manner that the product produced, i.e., pig iron and/or sponge iron, complies with a high quality standard at a minimum energy input, in particular exhibits a high degree of metallization and purity, such that further processing will be ensured without any problems.

In a plant of the initially described kind, this object is achieved in that the heating means is constructed such that it comprises two stages and that there are provided a heat exchanger as the heating means for the reducing gas and, connected serially therewith, a partial combustion means for the reducing gas with an oxygen feeding means.

Advantageously, a $CO_2$ removal means is provided in the reducing-gas feed duct of the fluidized bed reactor, for lowering the $CO_2$ content of the offgas formed in the fluidized bed reactor.

The process of the invention for producing pig iron and/or sponge iron is characterized in that fine ore is reduced to sponge iron with a reducing gas in a fluidized-bed direct reduction zone according to the fluidized bed method, wherein a purified offgas forming in the fluidized-bed direct reduction zone is supplied to the fluidized-bed direct reduction zone as a supplement to freshly supplied reducing gas, and that such offgas supplied to the fluidized-bed direct reduction zone is heated in two stages, preferably together with freshly supplied reducing gas, namely in a first stage through heat exchange and in a second stage through partial combustion by means of oxygen which is fed into at least a partial quantity of the reducing gas.

In order to lower the $CO_2$ content of the reducing gas supplied to the fluidized bed direct reduction zone to the desired measure, the offgas from the fluidized-bed direct reduction zone suitably is subjected to $CO_2$ removal.

Advantageously, the freshly supplied reducing gas is fed to the fluidized-bed direct reduction zone while bypassing the $CO_2$ removal means for the offgas from the fluidized-bed direct reduction zone.

Direct reduction in the fluidized bed process may be effected in two or several stages, as is known, for instance, from U.S. Pat. No. 5,082,251. Further, it is possible to carry out direct reduction by aid of a circulating fluidized bed, known, for instance, from EP-B-0 364 865.

In the following, the invention will be explained in more detail by way of an exemplary embodiment schematically illustrated in the drawing, wherein the FIGURE represented in the drawing illustrates the process scheme of a plant according to the invention.

The plant comprises two fluidized bed reactors 1, 2 consecutively connected in series, fine ore being conducted via a fine-ore supply duct 3 to the first fluidized bed reactor 1 and from there via a conveying duct 4 to the consecutively connected fluidized bed reactor 2. The material completely reduced in one fluidized-bed direct reduction zone 5 each of the fluidized bed reactors 1, 2 (sponge iron), upon emergence from the second fluidized bed reactor 2, is supplied to a briquetting plant 6 where it is hot- or cold-briquetted. Prior to introducing the fine ore into the first fluidized bed reactor 1, it is subjected to an ore preparation, such as drying, which, however, is not illustrated in detail.

Reducing gas is conducted through a gas duct 7 in counterflow to the ore flow, from the fluidized bed reactor 2 to the fluidized bed reactor 1, i.e., to the fluidized-bed direct reduction zones 5 provided in the fluidized bed reactors 1 and 2 and is carried off the first fluidized bed reactor 1—viewed in the ore flow direction—as an offgas through an offgas discharge duct 8.

The offgas drawn off the fluidized bed reactor 1 is cooled and scrubbed in a purification means 9 preferably designed as a wet scrubber and subsequently is mixed with the freshly supplied reducing gas by running together with a reducing-gas feed duct 10 supplying fresh reducing gas and the offgas discharge duct 8. The mixed gas thus formed is passed through a $CO_2$ removal means 11, preferably designed as a $CO_2$ scrubber, and is freed from $CO_2$. After this, heating of the mixed gas to a temperature of about 400° C. is effected in two stages in a heat exchanger 12. Following upon the same, there is an afterburning means 13, in which part of the mixed gas is burnt under oxygen supply, the mixed gas thus attaining the temperature required for the direct reduction in the fluidized bed reactors 1, 2 of up to about 850° C. This heated mixed gas then is available to the fluidized bed reactors 1, 2 as a reducing gas.

According to a preferred embodiment, only the offgas of the fluidized bed reactors 1, 2 is subjected to $CO_2$ scrubbing and the reducing gas freshly supplied via a duct 14 is mixed with the offgas only after $CO_2$ scrubbing of the same.

The briquetted sponge iron is processed in a compact steel works, for instance equipped with electric furnaces and converters. If necessary, briquetted sponge iron also may be charged into a melter gasifier through a conveying means and melted there. This is advantageous, in particular, if excess energy is available in a melter gasifier.

Advantageously, the heat exchanger 12 is operated with part of the offgas from the fluidized bed reduction, which is fed through a duct 15. Offgas that is not required for the reduction process or the heat exchanger 12 is supplied to other consumers through an export-gas discharge duct 16. The discharge duct 16 advantageously run into a gas collection tank, such as a gasometer, for the intermediate storage of the export gas. Thus, differences in gas production and deviations in pressure within the system may be checked and balanced out in an advantageous manner.

The briquetting plant 6 may be replaced with a discharge means 17, such as, e.g., a cold discharge means.

All of the conveying means and gas ducts are equipped with control organs or compressors, respectively, in a usual manner.

EXAMPLE

The fine ore charged into the fluidized bed reactor 1 is comprised of ore having a maximum grain size of 8 mm. It is reduced to sponge iron in two stages and subsequently is hot-briquetted. The hot-briquetted sponge iron has a degree of metallization ($Fe_{met}/Fe_{tot}$) of 92%.

The reducing gas introduced into the fluidized bed reactors 1, 2 is formed by mixing a top gas drawn off a reduction shaft furnace serving for the direct reduction of lump ore with a portion of the offgas drawn off the fluidized bed reactor 1 arranged first in the flow direction of the fine ore. This offgas incurs in an amount of 189,766 $Nm^3/h$ and has the chemical composition indicated below.

TABLE I

| | |
|---|---|
| CO [%] | 41.41 |
| $CO_2$ [%] | 25.28 |
| $H_2$ [%] | 17.10 |
| $H_2O$ [%] | 1.50 |
| $H_2S$ ppm | 22.31 |
| $CH_4$ [%] | 3.50 |
| $N_2$,Ar [%] | 11.21 |

Its calorific value is 8,337 kJ/ $Nm^3$. 20,905 $Nm^3$ of this offgas are branched off as an export gas for other purposes of use via the export-gas discharge duct 16. 151,000 $Nm^3/h$ of this offgas are mixed with the top gas drawn off the reduction shaft furnace after both the top gas and the offgas have been subjected to wet scrubbing.

The mixed gas thus formed (311,000 $Nm^3/h$) has a calorific value of 7,873 kJ/ $Nm^3$. Its chemical composition is as follows:

TABLE II

| | |
|---|---|
| CO [%] | 41.87 |
| $CO_2$ [%] | 30.73 |
| $H_2$ [%] | 16.43 |
| $H_2O$ [%] | 1.89 |
| $H_2S$ ppm | 75.14 |
| $CH_4$ [%] | 2.24 |
| $N_2$,Ar [%] | 6.83 |

After $CO_2$ scrubbing of this mixed gas in the $CO_2$ scrubber 11, its chemical composition is as follows:

TABLE III

| | |
|---|---|
| CO [%] | 61.34 |
| $CO_2$ [%] | 0.45 |
| $H_2$ [%] | 24.07 |
| $H_2O$ [%] | 0.70 |
| $H_2S$ ppm | 1.11 |
| $CH_4$ [%] | 3.32 |
| $N_2$,Ar [%] | 10.11 |

It amounts to 210,140 $Nm^3/h$, its calorific value being 11,547 kJ/ $Nm^3$. The gas carried off the $CO_2$ scrubber 11, which mainly contains $CO_2$, incurs in an amount of 100,860 $Nm^3/h$. Its chemical composition is indicated in Table IV below.

TABLE IV

| | |
|---|---|
| CO [%] | 1.29 |
| $CO_2$ [%] | 93.81 |
| $H_2$ [%] | 0.51 |
| $H_2O$ [%] | 4.37 |
| $H_2S$ ppm | 229.38 |
| $CH_4$ [%] | 0.00 |
| $N_2$,Ar [%] | 0.00 |

After this, heating of the mixed gas is effected in the heat exchanger 12 by burning offgas carried off the fluidized bed reactor 1 through gas duct 15 in an amount of 17,861 $Nm^3/h$. For such burning the feeding of air in an amount of 32,184 $Nm^3/h$ is necessary.

In the afterburning means 13, oxygen in an amount of 5,083 $Nm^3/h$ is fed into the mixed gas thus heated in the heat exchanger 12 such that a partial combustion of the mixed gas takes place. This mixed gas heated to a temperature of 820° C. then is available as a reducing gas for the direct reduction of fine ore in the fluidized bed reactors 1 and 2 in an amount of 210,845 $Nm^3/h$, having a calorific value of 10,947 kJ/ $Nm^3$. Its chemical composition is indicated in Table V below.

TABLE V

| | |
|---|---|
| CO [%] | 58.16 |
| $CO_2$ [%] | 3.60 |
| $H_2$ [%] | 22.82 |
| $H_2O$ [%] | 2.19 |
| $H_2S$ ppm | 1.11 |
| $CH_4$ [%] | 3.15 |
| $N_2$,Ar [%] | 10.09 |

What is claimed is:

1. A plant for the production of pig iron and/or sponge iron, comprising at least one fluidized bed reactor (1, 2) adapted to receive fine ore, a reducing-gas feed duct (7) leading to said fluidized bed reactor (1, 2), an off gas discharge duct (8) departing from the fluidized bed reactor (1) and a discharge means (17) provided for the reduction product formed in the fluidized bed reactor (1, 2), wherein the off gas discharge duct (8) of the fluidized bed reactor (1) runs into a purification means (9), subsequently into heating means and finally into the reducing-gas feed duct (7) of the fluidized bed reactor (1, 2), said heating means consisting of a heat exchanger (12) connected serially to a partial combustion means (13) provided with an oxygen feeding means.

2. A plant according to claim 1, characterized in that a $CO_2$ removal means (11) is provided in the reducing-gas feed duct (7) of the fluidized bed reactor (1, 2).

3. A process for the production of pig iron and/or sponge iron in a plant according to claim 1, characterized in that fine ore is reduced to sponge iron with a reducing gas in a fluidized-bed direct reduction zone (5) according to the fluidized bed method, said process comprising withdrawing an off gas containing $CO_2$ forming in the fluidized-bed direct reduction zone (5) from said zone, purifying it and supplying it to the fluidized-bed direct reduction zone (5) as a supplement to freshly supplied reducing gas, and heating said off gas supplied to the fluidized-bed direct reduction zone (5) in two stages, namely in a first stage (12) through heat exchange and in a second stage (13) through partial combustion by means of oxygen which is fed into at least a partial quantity of the reducing gas.

4. A process according to claim 1, wherein said step of purifying the off gas from the fluidized-bed direct reduction zone (5) comprises removing $CO_2$ therefrom.

5. A plant according to claim 1, wherein the discharge means (17) comprises a briquetting means (6).

6. A process according to claim 3, further comprising heating supplied reducing gas together with the purified off gas forming in the fluidized bed direct reaction zone.

* * * * *